United States Patent [19]

Klees et al.

[11] Patent Number: 5,775,970
[45] Date of Patent: Jul. 7, 1998

[54] TOY ANIMAL ADJUSTABLE LEASH WITH SOUND AND LIGHT

[76] Inventors: Daniel J. Klees, 224 W. Park St., Mundelein, Ill. 60060; Terri Shepherd, 241 N. California Ave., Mundelein, Ill. 60060

[21] Appl. No.: 671,214

[22] Filed: Jun. 27, 1996

[51] Int. Cl.⁶ .............................. A63J 5/04; A01K 27/00; A63H 5/00
[52] U.S. Cl. .............. 446/297; 446/397; 472/64; 119/792; 119/859; 119/863
[58] Field of Search ..................... 446/297, 303, 446/366, 397; 119/856, 859, 863, 792, 797–799; 472/57, 64

[56] References Cited

U.S. PATENT DOCUMENTS

| | | | |
|---|---|---|---|
| 1,490,185 | 4/1924 | Ross | 446/297 |
| 1,652,382 | 12/1927 | Swisher. | |
| 2,721,257 | 10/1955 | Knox. | |
| 3,760,532 | 9/1973 | Campion | 119/799 |
| 3,870,296 | 3/1975 | Ellis | 472/57 |
| 3,944,803 | 3/1976 | Chao | 119/859 |
| 4,282,681 | 8/1981 | McCaslin. | |
| 4,522,153 | 6/1985 | Vander Horst | 119/799 |
| 4,559,906 | 12/1985 | Smith | 119/863 |
| 4,887,552 | 12/1989 | Hayden | 119/859 |
| 5,145,447 | 9/1992 | Goldfarb | 446/408 |
| 5,316,515 | 5/1994 | Hyman et al.. | |
| 5,509,859 | 4/1996 | Klees et al. | 472/64 |

*Primary Examiner*—Robert A. Hafer
*Assistant Examiner*—Laura Fossum
*Attorney, Agent, or Firm*—Dick and Harris

[57] ABSTRACT

A toy leash with an adjustable harness, electronic sound and a light is attachable to one of a number of toy animals. Sound emanating from the toy leash and adjustable harness combination appears to be coming from the attached animal. Buckles and/or hook and loop fasteners are provided for adjustment of the harness. A flashlight is removably carried by the forward end of the leash. In an alternative embodiment, a section of the leash between the harness and the handle is telescopically adjustable.

11 Claims, 1 Drawing Sheet

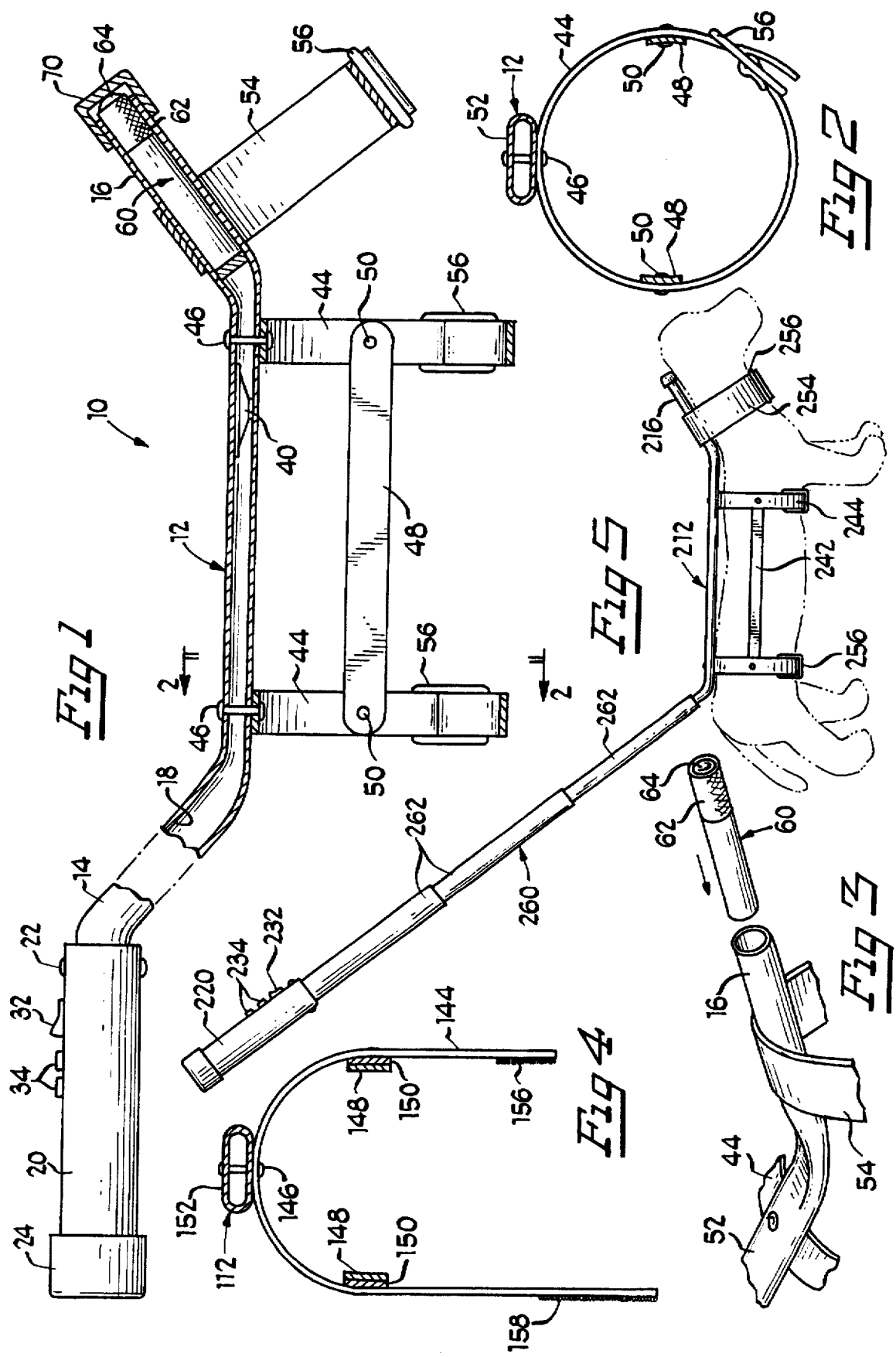

TOY ANIMAL ADJUSTABLE LEASH WITH SOUND AND LIGHT

BACKGROUND OF THE INVENTION

1. Field of the Invention

This invention relates generally to toy or novelty items and more particularly to a toy accessory providing sound and light for stuffed or other toy animals.

2. Background Art

Toy or novelty items exist in the prior art, such as is shown in Ellis U.S. Pat. No. 3,870,296 issued Mar. 11, 1975, in which a rigid, simulated leash supporting a simulated harness and/or collar at one end is manually controlled at the opposite end by a user to create an impression that an invisible or imaginary dog, or the like, is on the leash.

It is long been known in the toy and novelty art that sounds may be created within a doll, simulated animal, or other character, either mechanically or electronically, to create an impression of crying, barking or the like. Hyman et al. U.S. Pat. No. 5,316,515 which issued May 31, 1994 shows an example of an electronic sound producing device contained within a head and neck portion of a hobby horse. The sound producing device is contained within and completed obscured by the head and neck of the hobby horse so that the sounds appear to emanate from within the hobby horse. A toy such as that disclosed in Hyman et al. enhances the illusion of the toy animal actually making the sound. However, incorporating the sound producing device within the toy animal limits its use to the one toy animal.

Although not prior art, Applicants have also invented a simulated leash supporting a simulated harness and/or collar which provides electronic sounds to further create and enhance the illusion of an imaginary dog, or other animal, being on the free end of the leash. This invention is disclosed and claimed in Klees et al. U.S. Pat. No. 5,509,859 issued Apr. 23, 1996 on application Ser. No. 08/496,601 filed Jun. 29, 1995.

Nevertheless, there remains a need for a toy or novelty item which can be combined with any one of a large number of toy or stuffed animals that do not themselves have sound producing capabilities such that the play and enjoyment of such toy or stuffed animals may be enhanced by their apparent ability to make appropriate sounds.

SUMMARY OF THE INVENTION

The present invention is concerned with providing a toy or novelty item that, in combination with a toy or stuffed animal, provides a mechanism producing sounds that appear to emanate from the toy or stuffed animal. It comprises: an elongated, hollow member having opposed ends, a handle adjacent one end of the member, a free end at the other end of the member opposite the handle, a speaker carried proximate the free end of the member and obscured from view, electronic sound producing circuitry carried by the handle, a battery power source, electrical connections between the sound producing circuitry and the speaker, switches carried by the handle for manually actuating the sound producing circuitry, a harness for a toy animal attached to a portion of the member, the harness including at least one body strap loop for fitting around a toy animal, and the body strap loop including a fastener permitting adjustment of the size of the body strap loop. It can further include a toy animal to be fitted within the harness.

The speaker may be carried in the portion of the member to which the harness is attached. The sound producing circuitry may produce a plurality of sounds and switches for manual selection of individual ones of the plurality of sounds are carried by the handle.

The toy may further include a battery powered light source carried adjacent the free end of the member. A stop may be positioned within the member for positioning the light source. A removable cap may be provided for covering the light.

The harness may include a pair of body straps with lateral bands extending between and connecting the body straps plus fasteners allowing for adjustment of the length of lateral bands extending between the body straps.

The leash member may include a section of adjustable length extending between the handle and the portion of the leash member attached to the adjustable harness. Such adjustable length section may be telescoping.

BRIEF DESCRIPTION OF THE DRAWINGS

For a better understanding of the present invention, reference may be had to the accompanying drawings in which:

FIG. 1 is a side elevational view, partially in section, of the present invention;

FIG. 2 is a sectional view taken generally along Line 2—2 of FIG. 1;

FIG. 3 is a fragmentary, exploded perspective view;

FIG. 4 is a sectional view, similar to FIG. 2, but of an alternate embodiment; and FIG. 5 is a side elevational view of yet another embodiment.

DETAILED DESCRIPTION

Referring now to the drawings in which like parts are designated by like reference numerals throughout the several views, there is shown in FIG. 1, a toy animal adjustable leash 10 including a relatively rigid, elongated, hollow leash member 12 having a hand-held end 14 and a free end 16.

Leash member 12 is generally cylindrical in cross-section with a hollow interior 18, and may be made of a plastic material by extrusion. While somewhat flexible, leash member 12 is sufficiently rigid to maintain a preformed shape. Alternatively, leash member 12 may be formed of a hollow, more flexible material with a preformed bent wire in the hollow interior to provide form and a degree of rigidity to the leash.

At held end 14, leash member 12 is secured to a hollow handle 20 by a rivet 22 or the like. Alternatively, leash member 12 may be secured to handle 20 by an adhesive, as long as leash member 12 and handle 20 are prevented from being substantially displaced along their longitudinal axes and are prevented from rotating relative to each other. Opposite its attachment to leash member 12, hollow handle 20 is provided with a removable cap 24. Housed within hollow handle 20 are a conventional battery (not shown) and an integrated circuit or chip (not shown) for generating various electronic sound signals such as for a barking dog, a meowing cat, roaring lion or tiger, growling bear or the like. Operably disposed on the outer surface of handle 20 are an on/off switch 32 and a plurality of selector switches 34. Each of the switches is operably connected to the battery and integrated circuit board in a conventional manner. As an alternative to a plurality of selector switches, a single selector switch may be used in cooperation with an integrated circuit board modified in a conventional manner with a resetable register to count the number of successive depressions of the selector switch to then generate the appropriate sound signal. A micro speaker 40 is mounted within leash member 12 at a point away from handle 20 and more proximate the free end 16. As an alternative to mounting micro speaker 40 within portion 52 of the leash member 12 as is illustrated in FIG. 1, the micro speaker could be obscured from view by mounting it in handle 20 or within or on the inside surface of harness 42 or collar 54. Micro speaker 40 is connected to the integrated circuit by conventional wiring (not shown).

Proximate the free end 16 of leash member 12 is a harness 42 simulating the type of harness used for pet dogs or cats. Harness 42 includes a pair of depending body strap loops 44, each of which is attached to leash 12 by a rivet 46, or the like. A pair of lateral bands 48 extend on each side between body strap loops 44 and are secured to the body strap loops by rivets 50. As is illustrated in each of FIGS. 1 through 4, a portion 52 of leash member 12 that is proximate the free end 16, is flattened from the generally cylindrical shape of the rest of the leash member such that portion 52 forms an upper strap of harness 42. However, portion 52 is not so flattened as to preclude passage of the wires connecting micro speaker 40 and the integrated circuit or chip in hollow handle 20.

Attached adjacent the free end 16 of leash member 12 is a collar 54. Each of collar 54 and body strap loops 44 are provided with an adjustable fastener, which in this embodiment illustrated in FIGS. 1 through 3 is a buckle 56, which is best illustrated in FIG. 2. Buckles 56 allow for the adjustment of the size of the opening defined by each of the collar and body strap loops. Thus, harness 42 may be fitted around one of a number of different size or shape toy animals which a child may already have to enhance the enjoyment and play value of such toy animals. Alternatively, the invention as illustrated in FIG. 1 could be sold together with a particular toy animal.

Another feature of the present invention is best illustrated in FIGS. 1 and 3. As previously indicated, the cross-section of leash member 12, except for portion 52, is generally circular. The portion of the leash adjacent the free end 16, may be provided with a small cylindrical flashlight 60 that is received in the hollow interior 18 and retained by frictional engagement with the leash member. Flashlight 60 has a relatively rotatable forward portion 62. Rotation of the forward portion 62 relative to the rest of the flashlight will turn flashlight 60 on and off. Forward portion 62 carries a lens 64 through which the light provided by a bulb and battery (not shown) is projected.

Adjacent the transition of portion 52 of leash member 12 to the free end 16, there is a stop 68 that is preferably in water-tight sealing relationship with the interior of leash member 12 by use of a suitable adhesive. Stop 68 will thus serve to position the bottom of flashlight 60 with lens 64 projecting just beyond free end 16 and will also protect micro speaker 40 against any damage from water or other debris coming in through free end 16. To protect and retain flashlight 60 when it is not in use, a removable cap 70 is securable over free end 16.

In an alternate embodiment, buckles 56 are replacement with hook 156 and loop 158 fasteners such as VELCRO® fasteners. Such an alternate embodiment is illustrated in FIG. 4 in which body strap loop 144 is secured to a flattened portion 152 of a hollow leash member 112 by a rivet 146 or the like. One free end of body strap loop 144 is provided with a hook fastener 156 while the other free end of body strap loop 144 is provided with a strip of a cooperating loop fastener 158. Thus, as with buckle 56, the circumference of body straps 144 may readily be adjusted with hook 56 and loop fastener 158. In addition to the adjustability of body straps 144, the alternate embodiment illustrated in FIG. 4 provides for some adjustment of lateral bands 148 which are attached to body straps 144 by additional hook and loop fastener combinations 150.

Yet another alternative embodiment of the present invention is illustrated in FIG. 5 in which an adjustable harness 242 and collar 254 are attached to a hollow leash member 212 which houses a micro speaker (not shown) and flashlight (not shown) in a manner similar to that shown and described with respect to the embodiment illustrated in FIGS. 1 through 3. Leash member 212 has a forward free end 216 similar to free end 16 of the embodiment illustrated in FIGS. 1 through 3; however, at the opposite end, leash member 212 is connected to a more rigid shaft section 260. Preferably shaft section 260 is provided with a series of telescoping sections 262 that telescope into each other in a conventional manner to provide for a handle portion that may selectively be extended between, for example, one to three feet. Such adjustable length accommodates use by children of different ages and heights thus further enhancing the versatility and adaptability of the present invention. Similar to the embodiment illustrated in FIGS. 1 through 3, shaft 260 is provided at its hand-held end with a hollow handle 220 containing on/off and selector switches 232 and 234, respectively.

While particular embodiments of the invention have been shown and described with some further suggested alternatives, still further variations and modifications will occur to those skilled in the art. It is intended in the appended claims to cover all such variations and modifications as come within the true spirit and scope of the present invention.

What is claimed as new and desired to be secured by letters patent is:

1. A toy comprising:
    a substantially rigid, elongated, hollow leash member which maintains a preformed shape and having opposed ends;
    a handle adjacent one end of the member;
    a free end at the other end of the member opposite the handle;
    at least one adjustable body strap loop attached to the leash member proximate the free end configured to bit around a toy animal;
    a speaker carried by the toy proximate the free end of the leash member and obscured from view;
    electronic sound producing circuitry carried by the toy;
    a battery power source;
    electrical connections between the sound producing circuitry and the speaker;
    switches carried by the toy for manually actuating the sound producing circuitry; and
    the body strap loop including a fastener permitting adjustment of the size of the body strap loop.

2. The toy of claim 1 in which the speaker is carried in a portion of the leash member to which the body strap loop is attached.

3. The toy of claim 1 in which the sound producing circuitry produces a plurality of sounds and wherein the switches for manual selection of individual ones of the plurality of sounds are carried by the handle.

4. The toy of claim 1 including a toy animal to be secured within the body strap loop.

5. The toy of claim 1 including a self-contained battery powered light source removably carried adjacent the free end of the member.

6. The toy of claim 5 including a stop positioned within the member for positioning the light source.

7. The toy of claim 5 including a removable cap for covering the light.

8. The toy of claim 1 in which the toy includes:
- at least a pair of body straps;
- lateral bands extending between and connecting the body straps; and
- fasteners allowing for adjustment of the length of lateral bands extending between the body straps.

9. The toy of claim 1 in which the leash member includes a section of adjustable length extending between the handle and the portion of the leash member attached to the adjustable body strap loop.

10. The toy of claim 9 in which the section of adjustable length is telescoping.

11. The toy of claim 1 in which the power source is carried by the handle.

* * * * *

UNITED STATES PATENT AND TRADEMARK OFFICE
CERTIFICATE OF CORRECTION

PATENT NO. : 5,775,970
DATED : July 7, 1998
INVENTOR(S) : Klees et al.

It is certified that error appears in the above-indentified patent and that said Letters Patent is hereby corrected as shown below:

| | |
|---|---|
| Col. 4, Ln. 44 | Delete "bit" and insert instead --fit-- |
| Col. 5, Ln. 4 | After "light" insert --source-- |
| Col. 6, Ln. 7 | After "in which the" insert --battery-- |

Signed and Sealed this

Fifteenth Day of September, 1998

Attest:

BRUCE LEHMAN

Attesting Officer　　　Commissioner of Patents and Trademarks